(12) United States Patent
Nonaka et al.

(10) Patent No.: US 11,320,386 B2
(45) Date of Patent: May 3, 2022

(54) APPARATUS AND METHOD FOR DAMAGE DETECTION AND IMAGE CAPTURE OF DAMAGE WITHOUT OMISSION

(71) Applicant: FUJITSU LIMITED, Kawasaki (JP)

(72) Inventors: Yusuke Nonaka, Kawasaki (JP); Eigo Segawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 30 days.

(21) Appl. No.: 16/990,353

(22) Filed: Aug. 11, 2020

(65) Prior Publication Data

US 2021/0063315 A1    Mar. 4, 2021

(30) Foreign Application Priority Data

Aug. 30, 2019    (JP) .............................. JP2019-157868

(51) Int. Cl.
*G06K 9/00*    (2022.01)
*G01N 21/88*    (2006.01)
(Continued)

(52) U.S. Cl.
CPC ......... *G01N 21/8851* (2013.01); *G01N 21/88* (2013.01); *G01N 21/8803* (2013.01);
(Continued)

(58) Field of Classification Search
CPC ....... G06T 3/0068; G06T 3/20; G06T 3/4038; G06T 7/0002; G06T 7/0004;
(Continued)

(56) References Cited

U.S. PATENT DOCUMENTS 7,424,218 B2 *   9/2008   Baudisch ........... H04N 5/23238
                                                             348/36
9,613,419 B2 *   4/2017   Onda .................... G06T 7/0012
                         (Continued)

FOREIGN PATENT DOCUMENTS

EP       2947623 A1      11/2015
JP    2003-154483 A       5/2003
                (Continued)

OTHER PUBLICATIONS

Naoki Chiba et al. "Feature-Based Image Mosaicing", The Journal of the Institute of Electronics, Information and Communication Engineers (IEICE), vol. J82-D-II, No. 10, Oct. 1999, pp. 1581-1589 (Total 26 pages).

(Continued)

*Primary Examiner* — Eric Rush
(74) *Attorney, Agent, or Firm* — Fujitsu Patent Center (57) ABSTRACT

A detection apparatus includes a memory and a processor coupled to the memory. The processor configured to determine a position of each of a plurality of partial images relative to the wide-angle image, to extract, from among the plurality of partial images, a pair of partial images that are consecutive in an image-capturing order, that do not have an overlapping portion, and at least one of which includes an image of a damaged portion, to detect a region of the outside of the partial image to which a damaged portion is estimated to be continuous, as an image-capturing omission candidate region, to determine the image-capturing omission candidate region as an image-capturing omission region, in a case where the image-capturing omission candidate region is included in none of the other partial images, and to issue, based on the position, a notification of a position corresponding to the image-capturing omission region.

12 Claims, 11 Drawing Sheets

(51) Int. Cl.
*G06T 7/70* (2017.01)
*G06T 7/00* (2017.01)
*G06V 10/98* (2022.01)
*G06V 10/10* (2022.01)
*G06V 10/25* (2022.01)

(52) U.S. Cl.
CPC .......... *G06T 7/0002* (2013.01); *G06T 7/0004* (2013.01); *G06T 7/70* (2017.01); *G06T 7/97* (2017.01); *G06V 10/16* (2022.01); *G06V 10/25* (2022.01); *G06V 10/98* (2022.01); *G06V 10/993* (2022.01); *G01N 2021/8887* (2013.01); *G06T 2207/10016* (2013.01); *G06T 2207/30132* (2013.01); *G06T 2207/30168* (2013.01); *G06V 2201/08* (2022.01)

(58) Field of Classification Search
CPC ........... G06T 7/0012; G06T 7/70; G06T 7/73; G06T 7/74; G06T 7/97; G06T 2200/32; G06T 2207/10016; G06T 2207/30004; G06T 2207/30108; G06T 2207/30132; G06T 2207/30168; G06T 2207/30248; G06T 2207/30252; G06K 9/00671; G06K 9/3216; G06K 9/3233; G06K 9/3241; G06K 9/62; G06K 2009/2045; G01N 21/88; G01N 21/8803; G01N 21/8806; G01N 21/8851; G01N 2021/8887; G01N 2021/8893; G01B 11/02; H04N 5/23218; H04N 5/23222; H04N 5/23238; G06V 10/16; G06V 10/22; G06V 10/25; G06V 10/255; G06V 10/70; G06V 10/764; G06V 10/98; G06V 10/987; G06V 10/993; G06V 20/20; G06V 2201/08

USPC ....... 382/100, 103, 128, 132, 141–145, 149, 382/150, 152, 154, 181, 190, 224, 282, 382/291; 348/92, 125–130, 142; 701/29.1, 31.4, 31.7
See application file for complete search history.

(56) References Cited

U.S. PATENT DOCUMENTS

| | | | |
|---|---|---|---|
| 10,165,939 B2* | 1/2019 | Imamura | A61B 3/1241 |
| 10,198,003 B2* | 2/2019 | Sabe | H04N 5/23238 |
| 10,489,903 B2* | 11/2019 | Li | G06T 7/0004 |
| 10,753,881 B2* | 8/2020 | Jahanshahi | G06T 7/0004 |
| 11,087,138 B2* | 8/2021 | Guo | G06T 7/0004 |
| 2003/0095250 A1 | 5/2003 | Kitagawa et al. | |
| 2018/0068200 A1 | 3/2018 | Nonaka et al. | |
| 2019/0379829 A1 | 12/2019 | Yonaha et al. | |
| 2020/0349695 A1* | 11/2020 | Horita | G06T 7/0004 |

FOREIGN PATENT DOCUMENTS

| | | |
|---|---|---|
| JP | 2016-126595 A | 7/2016 |
| JP | 2017-211976 A | 11/2017 |
| JP | 2018-036226 A | 3/2018 |
| WO | 2018/168406 A1 | 9/2018 |

OTHER PUBLICATIONS

Extended European Search Report dated Jan. 15, 2021 for corresponding European Patent Application No. 20190708.6, 6 pages.
*Please note WO-2018/168406-A1 cited herewith, was previously cited in IDS filed on Aug. 11, 2020.*

* cited by examiner

| PARTIAL IMAGE | COMBINATION | OVERLAP | DAMAGE EXTENDING TO OUTSIDE | CAPTURED | |
|---|---|---|---|---|---|
| P1 | | | | | |
| | A | YES | | | |
| P2 | | | | | |
| | B | YES | | | |
| P3 | | | | | |
| | C | YES | | | |
| P4 | | | | | |
| | D | YES | | | |
| P5 | | | | | |
| | E | NO | YES | NO | COMMON REGION |
| | | | YES | NO | |
| P6 | | | | | |
| | F | YES | | | |
| P7 | | | | | |
| | G | NO | YES | YES | |
| | | | YES | NO | |
| P8 | | | | | |
| | H | YES | | | |
| P9 | | | | | |
| | I | YES | | | |
| P10 | | | | | |
| | J | YES | | | |
| P11 | | | | | |
| | K | NO | YES | YES | |
| | | | YES | YES | |
| P12 | | | | | |
| | L | NO | YES | YES | |
| | | | YES | YES | |
| P13 | | | | | |
| | M | YES | | | |
| P14 | | | | | |

APPARATUS AND METHOD FOR DAMAGE DETECTION AND IMAGE CAPTURE OF DAMAGE WITHOUT OMISSION

CROSS-REFERENCE TO RELATED APPLICATION

This application is based upon and claims the benefit of priority of the prior Japanese Patent Application No. 2019-157868, filed on Aug. 30, 2019, the entire contents of which are incorporated herein by reference.

FIELD

The embodiments discussed herein are related to a detection apparatus and a detection method.

BACKGROUND

It is important to capture and record images of states of damages of buildings, bridges, and so on in terms of safety management. When a state of a damage is recorded, it is desirable to acquire quantitative information from which the detailed state of the damage is identifiable and to acquire information on the position of the damaged portion. For example, in the case where a crack having a width of 0.1 mm is detected from one panel (6 m×3 m) of the floorboard of a bridge and is recorded, it is difficult to acquire both of these two pieces of information from one image.

If an image is captured to include the entire floorboard, it is difficult to visually recognize the crack having the width of 0.1 mm in the image. It is also difficult to know which part of the entire floorboard the crack is present from the image in which the crack is visually recognizable. Therefore, capturing an image in which a crack is visually recognizable involves work such as separately recording the position of the crack, for example.

Related techniques are disclosed in for example International Publication Pamphlet No. WO 2018/168406 and Japanese Laid-open Patent Publication Nos. 2018-36226 and 2017-211976, and "Feature-Based Image Mosaicing", The Transactions of the Institute of Electronics, Information and Communication Engineers, Vol. J82-D-II, No. 10, October 1999, pp. 1581-1589.

SUMMARY

According to an aspect of the embodiments, a detection apparatus includes a memory and a processor coupled to the memory, the processor configured to determine, based on a wide-angle image obtained by capturing an image of entirety of an image-capturing subject and a plurality of partial images of respective portions of the image-capturing subject, a position of each of the plurality of partial images relative to the wide-angle image, extract, from among the plurality of partial images, a pair of partial images that are consecutive in an image-capturing order, that do not have an overlapping portion, and at least one of which includes an image of a damaged portion, detect, in a case where the damaged portion is estimated to be continuous to outside of the partial image that includes the image of the damaged portion among the extracted pair of partial images, a region of the outside of the partial image to which the damaged portion is estimated to be continuous, as an image-capturing omission candidate region, determine the image-capturing omission candidate region as an image-capturing omission region, in a case where the image-capturing omission candidate region is included in none of the other partial images, and issue, based on the position, a notification of a position corresponding to the image-capturing omission region in the wide-angle image.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, there is a technique for acquiring a wide-angle image including the entire floorboard and partial images in which a crack is visually recognizable by using a moving body that is controlled by a computer. According to this technique, partial images are combined to create a composite image having a resolution with which a crack is visually recognizable. According to this technique, a wide-angle image is captured first. Then, a plan of capturing partial images is made in consideration of margins. When a partial image is acquired, the partial image is associated with the wide-angle image to acquire the current position of the moving body. In addition, the moving body acquires information on a position to which the moving body is to move next to capture another partial image. In this manner, this technique enables partial images of the entire floorboard to be captured without omission at an appropriate resolution.

This technique, however, assumes the use of a moving body controlled by a computer when partial images are acquired.

In one aspect, it is an object of the present invention to make it possible to detect, with a simple apparatus, omission in capturing of images of a damaged portion of an image-capturing subject.

First Embodiment

An example of a first embodiment will be described in detail below with reference to the drawings.

Figure 1:
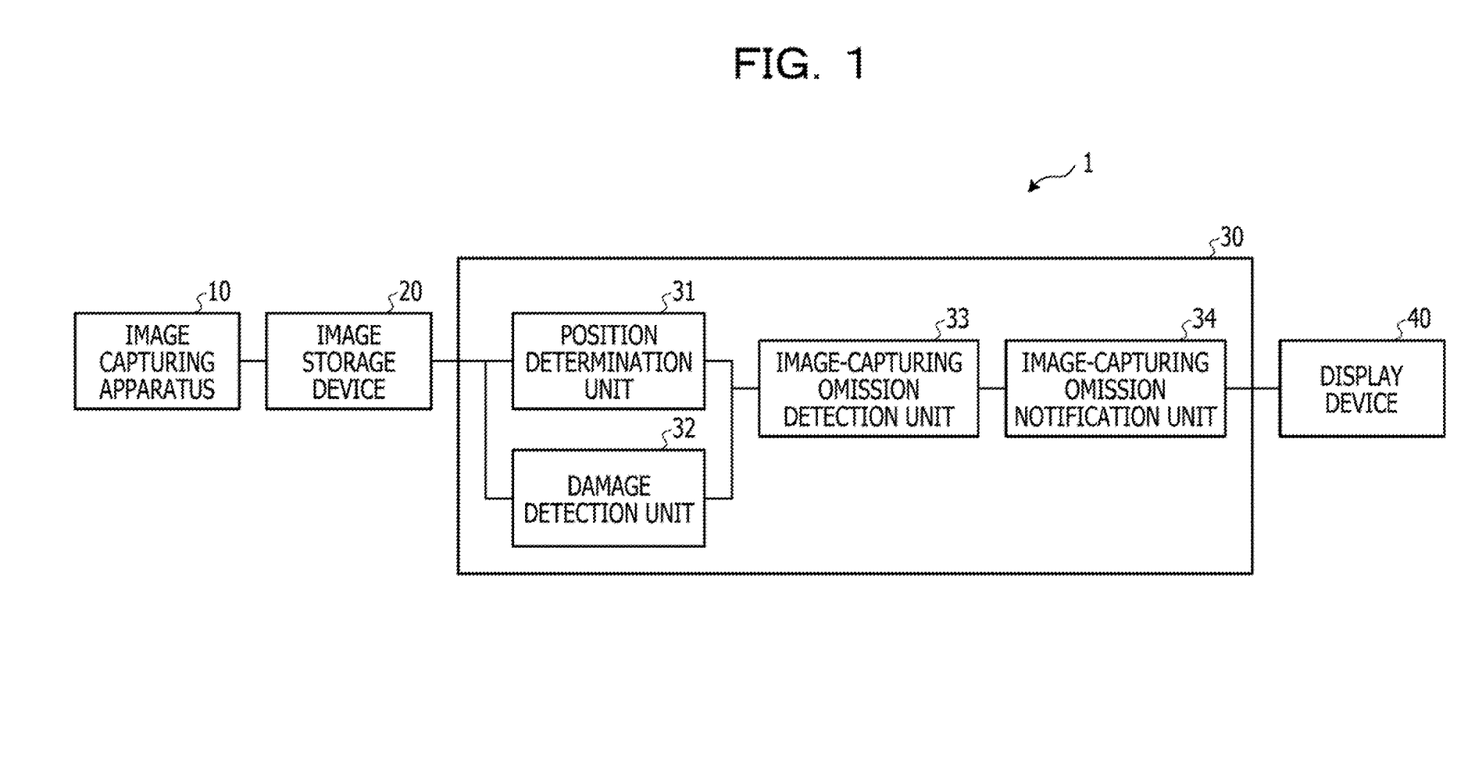
FIG. 1 is a block diagram illustrating an example of a system configuration according to a first embodiment.

An image processing system 1 illustrated in FIG. 1 includes an image capturing apparatus 10, an image storage device 20, an image-capturing omission detection apparatus 30, and a display device 40. The image capturing apparatus 10 may be, for example, a small digital camera that captures an image with being held with user's hands, or a camera built in a smart device or the like. The image storage device 20 stores a wide-angle image and partial images captured by the image capturing apparatus 10.

The image-capturing omission detection apparatus 30 includes a position determination unit 31, a damage detection unit 32, an image-capturing omission detection unit 33, and an image-capturing omission notification unit 34. The display device 40 may be, for example, a liquid crystal display or the like, or may be a liquid crystal display integrated into the image capturing apparatus 10. The image storage device 20 may be included in the image capturing apparatus 10 or the image-capturing omission detection apparatus 30, instead of being coupled to the image capturing apparatus 10 and the image-capturing omission detection apparatus 30. The image capturing apparatus 10, the image storage device 20, the image-capturing omission detection apparatus 30, and the display device 40 may be coupled to each other with a cable or may be coupled to one another wirelessly.

The position determination unit 31 of the image-capturing omission detection apparatus 30 determines the position of each partial image in a wide-angle image. A wide-angle image is an image obtained by capturing an image of the entire image-capturing subject, and a range of the entire image-capturing subject is determined by a user. The image-capturing subject may be, for example, a portion of a predetermined range of a bottom portion of a bridge, a portion of a predetermined range of a wall portion of a building, an exterior of a ship, and the like. Partial images of predetermined ranges are images of respective portions of an image-capturing subject sequentially captured while the image-capturing range is shifted for the respective portions. It is common that a damaged portion is visually confirmed in advance, and a partial image is captured by a user to know the details of the damaged portion.

To determine the position of each of the partial images in the wide-angle image, for example, a homography matrix is calculated which is a projective transformation matrix between the wide-angle image and each of the partial images. A homography is an extension of an affine transformation. In this manner, the positional correspondence between the wide-angle image and each of the partial images is successfully identified, and the position of each of the partial images in the wide-angle image is successfully determined. The damage detection unit 32 detects an image of a damaged portion from each of the partial images. Any existing method is usable for detection. The damage may be, for example, cracking, fouling, or the like.

Figure 2:
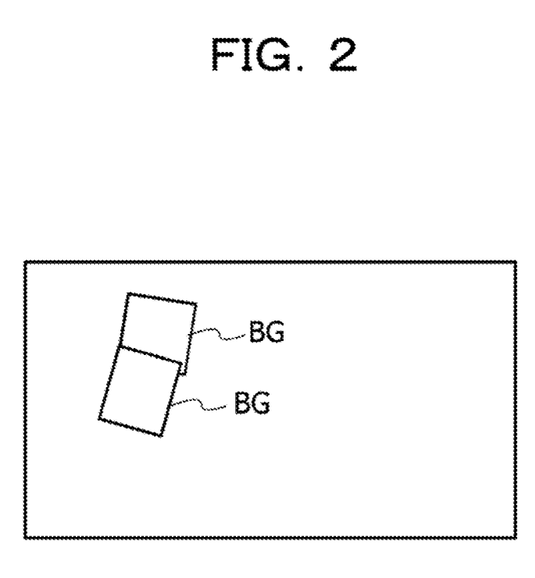
FIG. 2 is a conceptual diagram illustrating an example of overlapping partial images.

The image-capturing omission detection unit 33 detects omission in image capturing in the case where (1) two consecutive partial images in the image-capturing order have no overlapping portion, (2) a damaged portion extends to outside of at least one of the partial images, and (3) there is no partial image including the damaged portion extending to the outside other than the two partial images. Since a region of each partial image is a rectangular region, the region of the partial image is representable as a solution of four first-order two-variable simultaneous inequalities each corresponding to one of the four sides of the rectangle. As illustrated in FIG. 2, when simultaneous inequalities of two partial images BG have a common solution, it is determined in terms of (1) that the two partial images have an overlapping portion.

Figure 3:
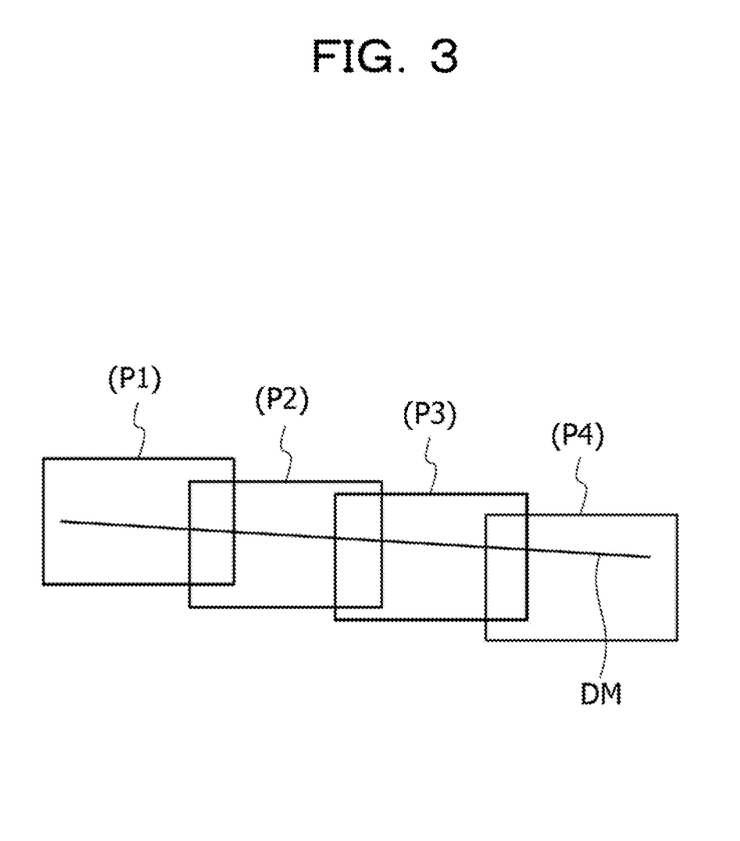
FIG. 3 is a conceptual diagram illustrating an example of an image-capturing order of partial images.

The reasons why two consecutive partial images in the image-capturing order are focused on are that a damaged portion DM has a continuous shape as illustrated in FIG. 3 and images of adjacent regions are consecutively captured (in an order of P1, P2, P3, and P4 in FIG. 3) not only from the viewpoint of work efficiency but also from the viewpoint of avoiding omission in image capturing. In the case where images of adjacent regions are consecutively captured and two consecutively captured images have a common portion, the two images overlap. On the other hand, in the case where two consequently captured images have no common portion, an image-capturing omission region may be present between the two images or a user has intentionally changed the image-capturing subject.

Figure 4:
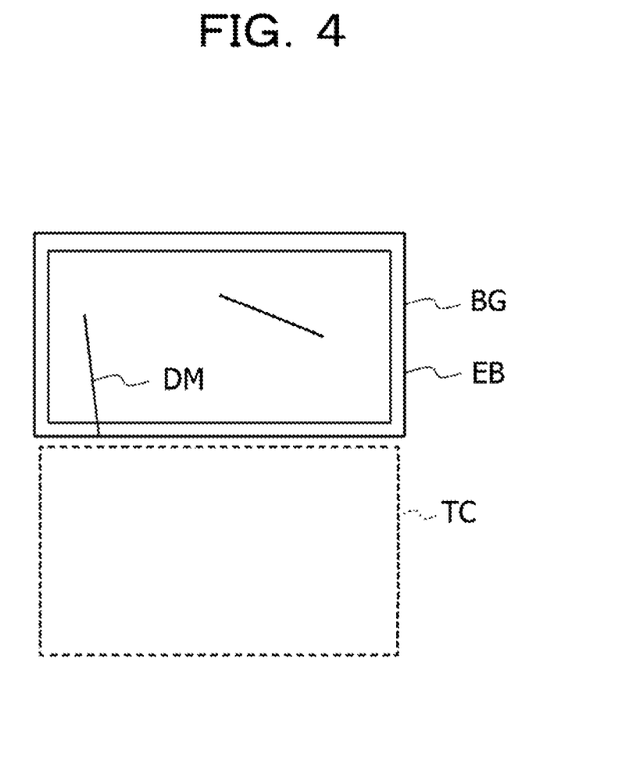
FIG. 4 is a conceptual diagram illustrating an example of an image-capturing omission candidate region.

In the case where an image-capturing omission region is present, it is highly likely that the damaged portion DM extends to outside of the partial image BG as illustrated in FIG. 4 in at least one of the two consecutively captured partial images. Therefore, a region TC that is outside the partial image BG and in which the damaged portion is estimated to extend is set as an image-capturing omission candidate region. The size of an image-capturing omission candidate region and the size of an image-capturing omission region may be substantially equal to the size of a partial image.

For example, an image end region EB having a width of N pixels (where N is a predetermined integer) along the upper, lower, left, and right sides of the partial image BG is provided at the image end of the partial image BG. In the case where at least a part of the image of the damaged portion is present in the image end region EB, it is determined in terms of (2) that the damaged portion extends to outside of at least one of the partial images. The N pixels may be, for example, a number of pixels that is equivalent to about 1/50 to 1/70 of the width or height of the partial image.

The image-capturing omission detection unit 33 checks whether there is a partial image including an image-capturing omission candidate region. For example, in the case where the solution of the simultaneous inequalities representing the image-capturing omission candidate region is not included in the solutions of the simultaneous inequalities representing the regions of all the partial images, the image-capturing omission detection unit 33 detects the image-capturing omission candidate region as the image-capturing omission region.

Figure 5:
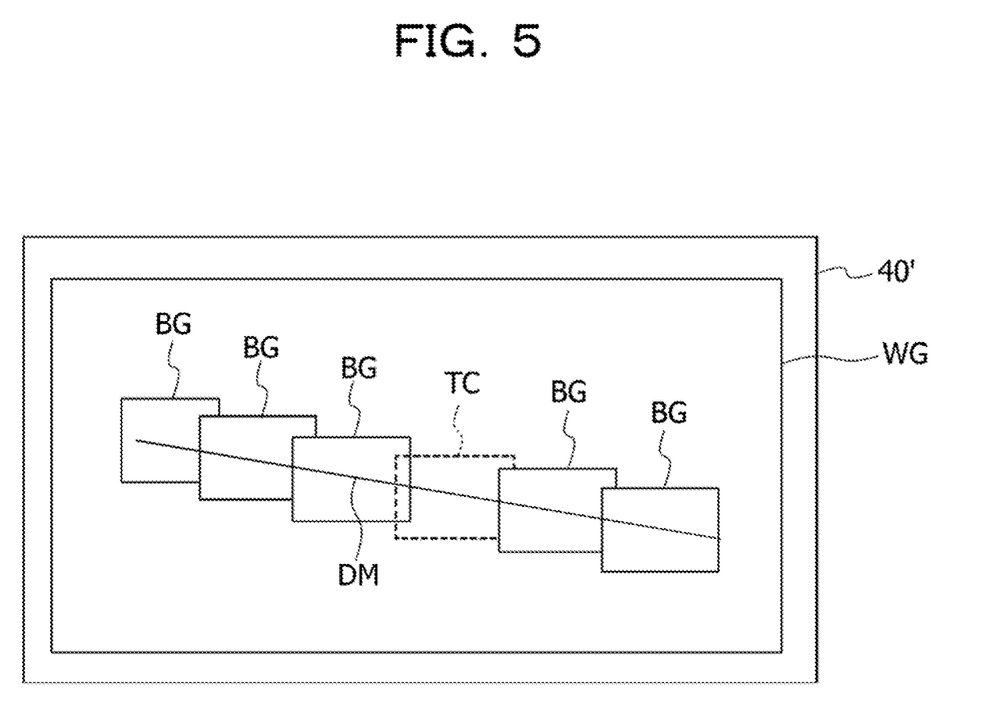
FIG. 5 is a conceptual diagram illustrating an example of a notification of an image-capturing omission region.

The image-capturing omission notification unit 34 notifies a user of the image-capturing omission region. For example, as illustrated in FIG. 5, a wide-angle image WG is displayed on a screen of a display 40', which is an example of the display device 40, and the image-capturing omission region TC is displayed as a broken-line rectangle on the wide-angle image WG, together with each of the partial images BG and the image of the detected damaged portion DM. The way in which the image-capturing omission region TC is displayed is merely an example, and the image-capturing omission region TC may be displayed as a rectangle having a color or brightness different from that of other portions, for example.

Figure 6:
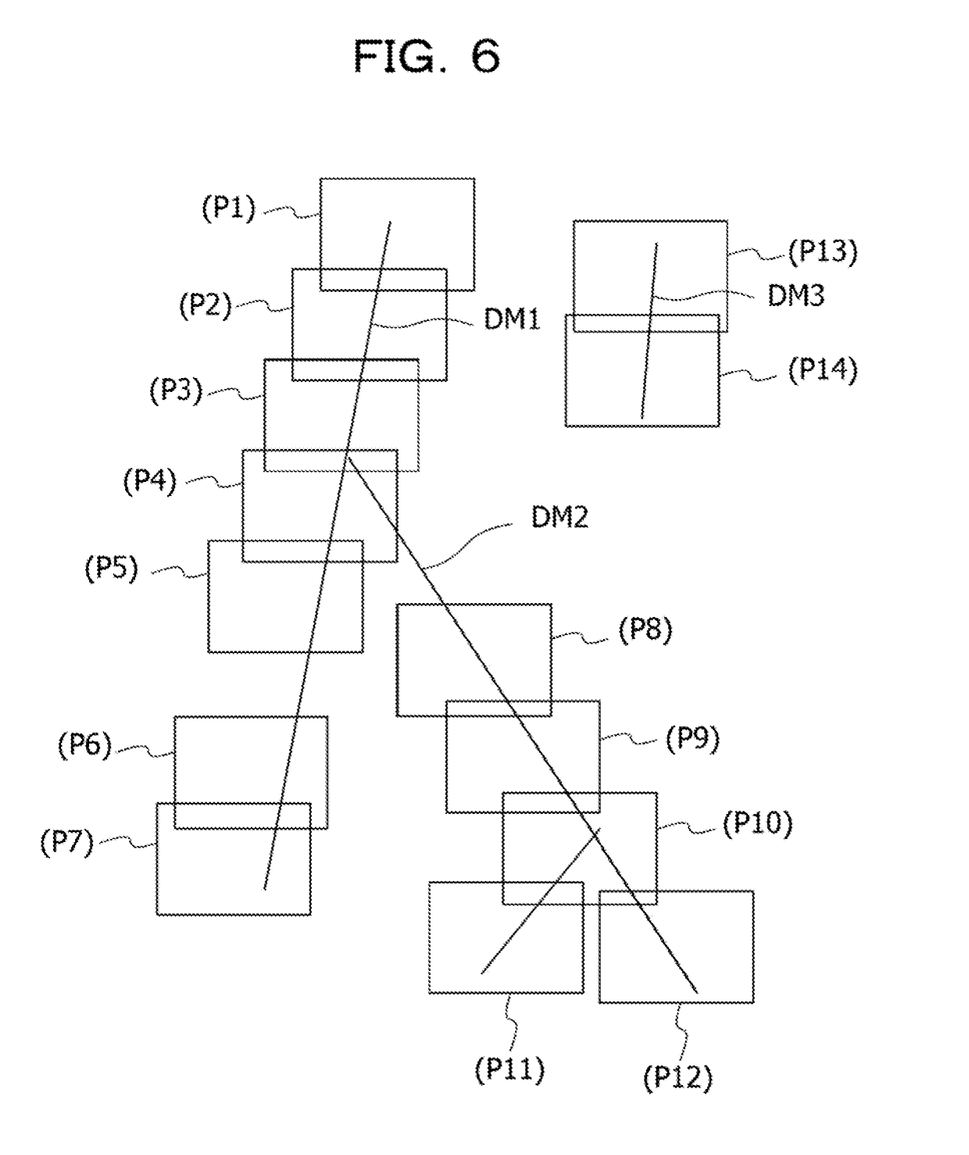
FIG. 6 is a conceptual diagram illustrating an example of a plurality of partial images to be subjected to an image-capturing omission detection process.
Figure 7:
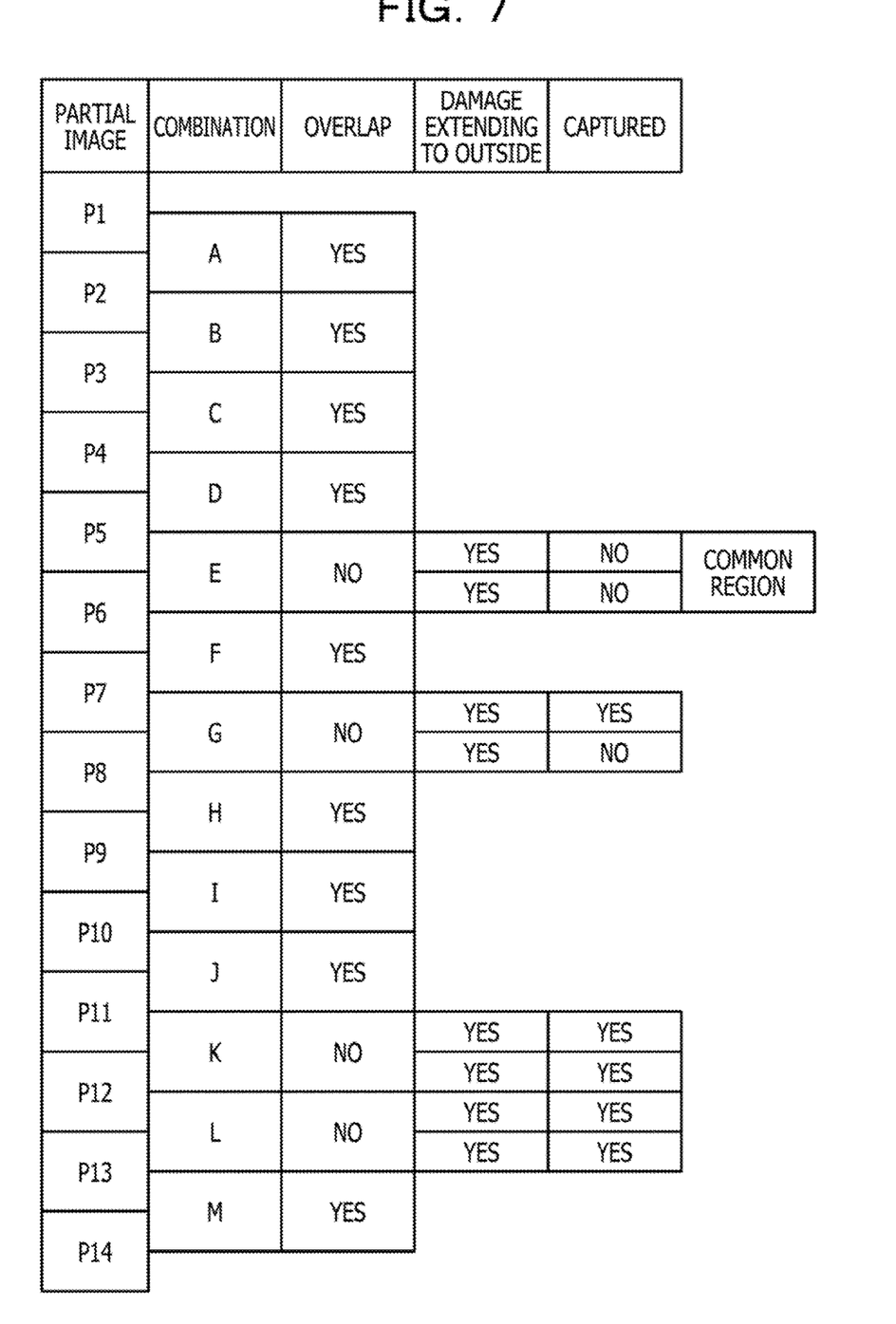
FIG. 7 is a table illustrating an example of intermediate determination data obtained in the image-capturing omission detection process.

FIG. 6 illustrates partial images P1 to P14 captured along damaged portions in an order of damaged portions DM1, DM2, and DM3. As illustrated in FIG. 7, a combination A of partial images P1 and P2, a combination B of partial images P2 and P3, a combination C of partial images P3 and P4, a combination D of partial images P4 and P5, a combination F of partial images P6 and P7, a combination H of partial images P8 and P9, a combination I of partial images P9 and P10, a combination J of partial images P10 and P11, and a combination M of partial images P13 and P14 each have an overlap. In other words, two partial images included in each combination overlap. Therefore, there is no omission in image capturing for the combinations A, B, C, D, F, H, I, J, and M.

A combination E of partial images P5 and P6, a combination G of partial images P7 and P8, a combination K of partial images P11 and P12, and a combination L of P12 and P13 each do not have an overlap. In other words, two partial images included in each combination do not overlap. Therefore, there may be omission in image capturing. Since there is a damaged portion extending to outside of at least one of the partial images for the combinations E, G, K, and L, there may still be omission in image capturing. Thus, each position of the damaged portion extending to the outside of at least one of the partial images is detected as the image-capturing omission candidate region.

However, since the image-capturing omission candidate region is included in any of the other partial images for the combinations K and L, there is no omission in image capturing. On the other hand, since the image-capturing omission candidate region is included in none of the other partial images for the combination E, the image-capturing omission candidate region is detected as the image-capturing omission region. In the combination E, the position of the damaged portion extending to the outside of the partial image P5 and the position of the damaged portion extending to the outside of the partial image P6 are in a region having a size equal to that of one partial image, for example, in a common region. In this case, the image-capturing omission region is set to partially overlap with both of the partial images P5 and P6. On the other hand, in the combination G, since the position of the damaged portion extending to the outside of the partial image P7 and the image-capturing omission candidate region are included in none of the other partial images, the image-capturing omission candidate region is detected as the image-capturing omission region.

Figure 8:
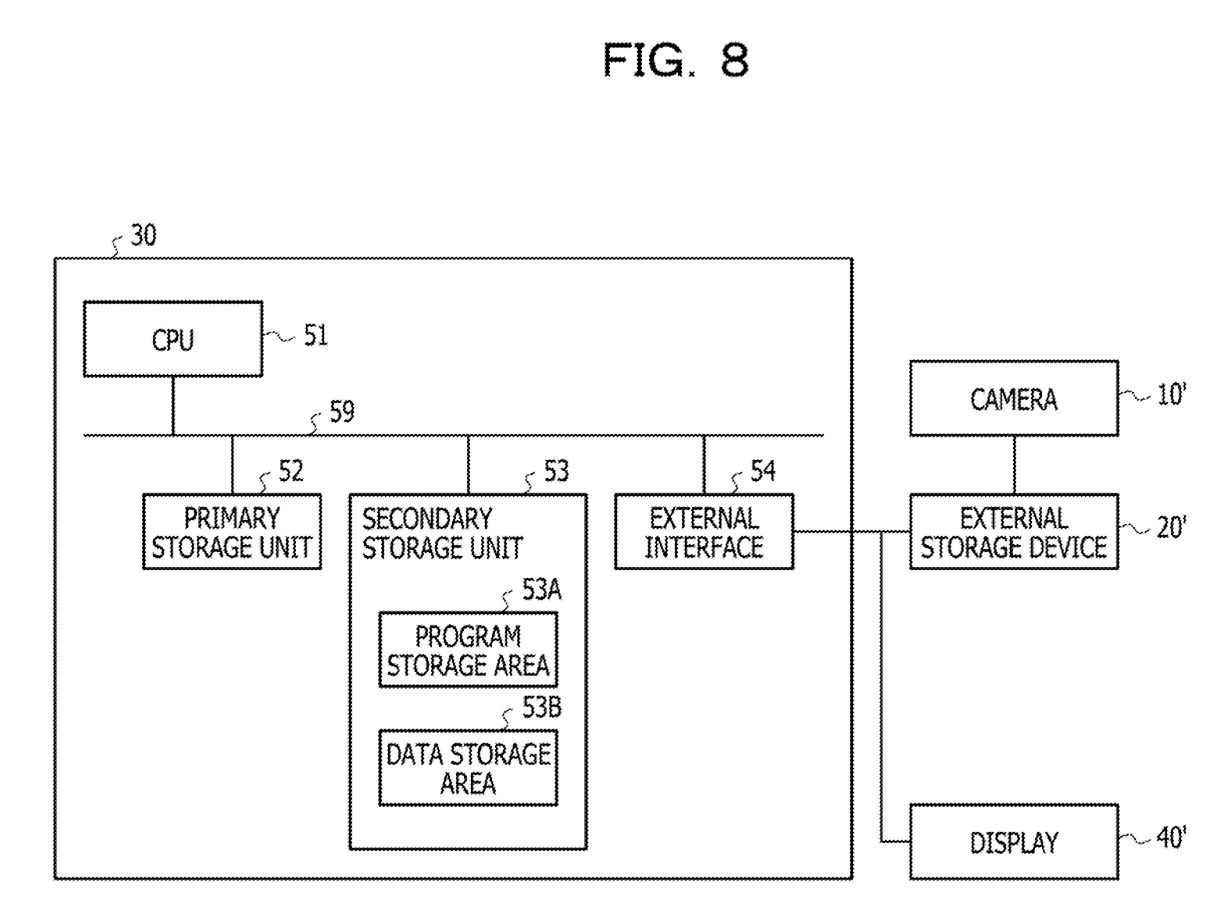
FIG. 8 is a hardware configuration diagram illustrating an example of the first embodiment.

As illustrated in FIG. 8, the image-capturing omission detection apparatus 30 includes a central processing unit (CPU) 51, a primary storage unit 52, a secondary storage unit 53, and an external interface 54, for example. The CPU 51 is an example of a processor which is hardware. The CPU 51, the primary storage unit 52, the secondary storage unit 53, and the external interface 54 are coupled to one another via a bus 59.

The primary storage unit 52 is a volatile memory such as a random-access memory (RAM), for example. The secondary storage unit 53 is a nonvolatile memory such as a hard disk drive (HDD) or a solid state drive (SSD), for example.

The secondary storage unit 53 includes a program storage area 53A and a data storage area 53B. In one example, the program storage area 53A stores programs such as an image-capturing omission detection program. In one example, the data storage area 53B stores intermediate data or the like that is generated while the image-capturing omission detection program is being executed.

The CPU 51 reads out the image-capturing omission detection program from the program storage area 53A and deploys the image-capturing omission detection program to the primary storage unit 52. The CPU 51 loads and executes the image-capturing omission detection program to operate as the position determination unit 31, the damage detection unit 32, the image-capturing omission detection unit 33, and the image-capturing omission notification unit 34 illustrated in FIG. 1.

Programs such as the image-capturing omission detection program may be stored in an external server, and may be deployed to the primary storage unit 52 via a network. The programs such as the image-capturing omission detection program may be stored on a non-transitory recording medium such as a digital versatile disc (DVD), and may be deployed to the primary storage unit 52 via a recording medium reading device.

External devices are coupled to the external interface 54. The external interface 54 manages transmission and reception of various kinds of information between the external devices and the CPU 51. FIG. 8 illustrates an example in which an external storage device 20' which is an example of the image storage device 20 and the display 40' which is an example of the display device 40 are coupled to the external interface 54. A camera 10', which is an example of the image capturing apparatus 10, is coupled to the external storage device 20'.

Neither the external storage device 20' nor the display 40' may be coupled to the external interface 54, or only one of the external storage device 20' and the display 40' may be coupled to the external interface 54. For example, one of or both of the external storage device 20' and the display 40' may be built in the image-capturing omission detection apparatus 30, or may be disposed at a location away from the image-capturing omission detection apparatus 30 and may be coupled via a network.

The image-capturing omission detection apparatus 30 may be a personal computer, a notebook computer, a tablet, or the like, may exist on a cloud, for example, and may communicate with the image storage device 20 and the display device 40 via a network.

Figure 9:
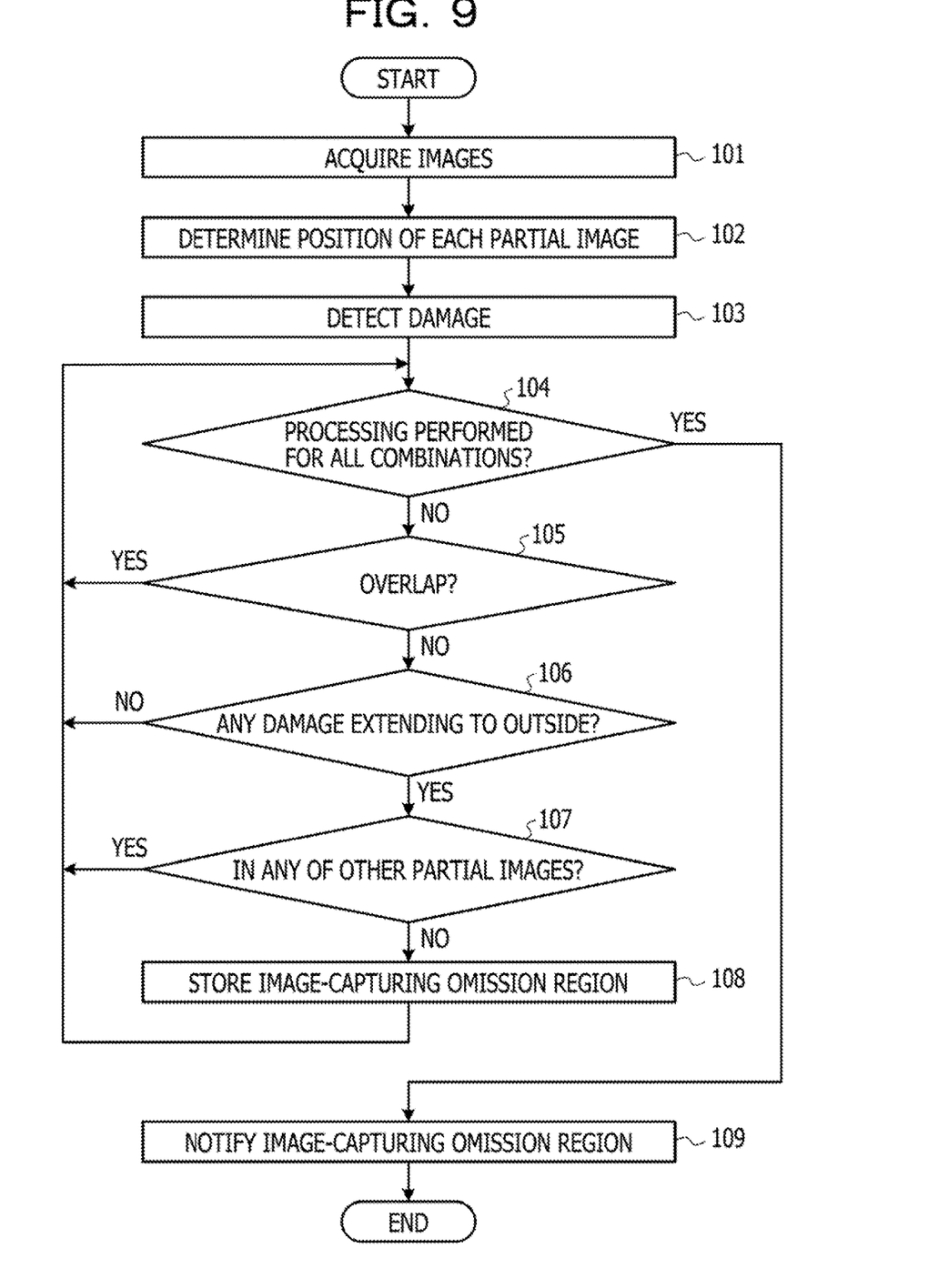
FIG. 9 is a flowchart illustrating an example of a flow of a process according to the first embodiment.

FIG. 9 illustrates an example of a flow of an image-capturing omission detection process. In step 101, the CPU 51 acquires a wide-angle image and a plurality of partial images from the external storage device 20'. In step 102, the CPU 51 determines the position of each of the plurality of partial images in the wide-angle image.

In step 103, the CPU 51 detects an image of a damaged portion in each of the plurality of partial images. In step 104, the CPU 51 determines whether or not processing has been completed for all combinations of two consecutively captured partial images. If the determination in step 104 is negative, the CPU 51 determines in step 105 whether or not the two partial images overlap. If the determination in step 105 is negative, the CPU 51 determines in step 106 whether or not there is a damaged portion extending to the outside of at least one of the partial images.

If the determination in step 106 is positive, the CPU 51 determines in step 107 whether or not the image-capturing omission candidate region at the position that is outside the partial image in which the damaged portion extends is included in any of the other partial images. If the determination in step 107 is negative, the CPU 51 stores in step 108 the image-capturing omission candidate region as the image-capturing omission region.

The process then returns to step 104, and the CPU 51 repeats the processing of steps 104 to 108. If the determinations in step 105 or 107 is positive or if the determination in step 106 is negative, the process also returns to step 104. If the determination in step 104 is positive, the CPU 51 notifies in step 109 a user of the image-capturing omission region, and then ends the process.

When a user captures partial images representing the details of a damaged portion without using a moving body controlled by a computer, it is difficult to capture the images without the occurrence of omission in image capturing. It takes long time to capture images while checking the captured images so as to avoid the occurrence of omission in image capturing. For example, in the case where a user captures images from a remote place with a long focal length, the image-capturing range largely deviates due to a slight deviation of the direction of the camera. Consequently, images of the image-capturing position intended by the user are not captured.

In the present embodiment, a position of each of a plurality of partial images relative to a wide-angle image is determined based on the wide-angle image obtained by capturing an image of entirety of an image-capturing subject and the plurality of partial images obtained by sequentially capturing images of respective portions of the image-capturing subject while an image-capturing range is shifted for the respective portions. A pair of partial images that are consecutive in an image-capturing order, that do not have an overlapping portion, and at least one of which includes an image of a damaged portion is extracted from among the plurality of partial images. In a case where the damaged portion is estimated to be continuous to outside of the partial image including the image of the damaged portion among the extracted pair of partial images, a position of the outside of the partial image to which the damaged portion is estimated to be continuous is detected as an image-capturing omission candidate region. In a case where the image-capturing omission candidate region is included in none of the other partial images, the image-capturing omission candidate region is detected as an image-capturing omission region. Based on the determined position, a notification of the position corresponding to the image-capturing omission region in the wide-angle image is issued.

The present embodiment makes it possible to acquire images including information on a state of a damaged portion and a position of the damaged portion with a simple apparatus such as a commercially available inexpensive digital camera without using a special image capturing apparatus that moves using a moving body controlled by a computer. Consequently, the present embodiment makes it possible to detect, with a simple apparatus, omission in capturing of images of a damaged portion of an image-capturing subject.

Second Embodiment

An example of a second embodiment will be described in detail below with reference to the drawings. Description of the configurations and operations that are substantially the same as those of the first embodiment is omitted.

Figure 10:
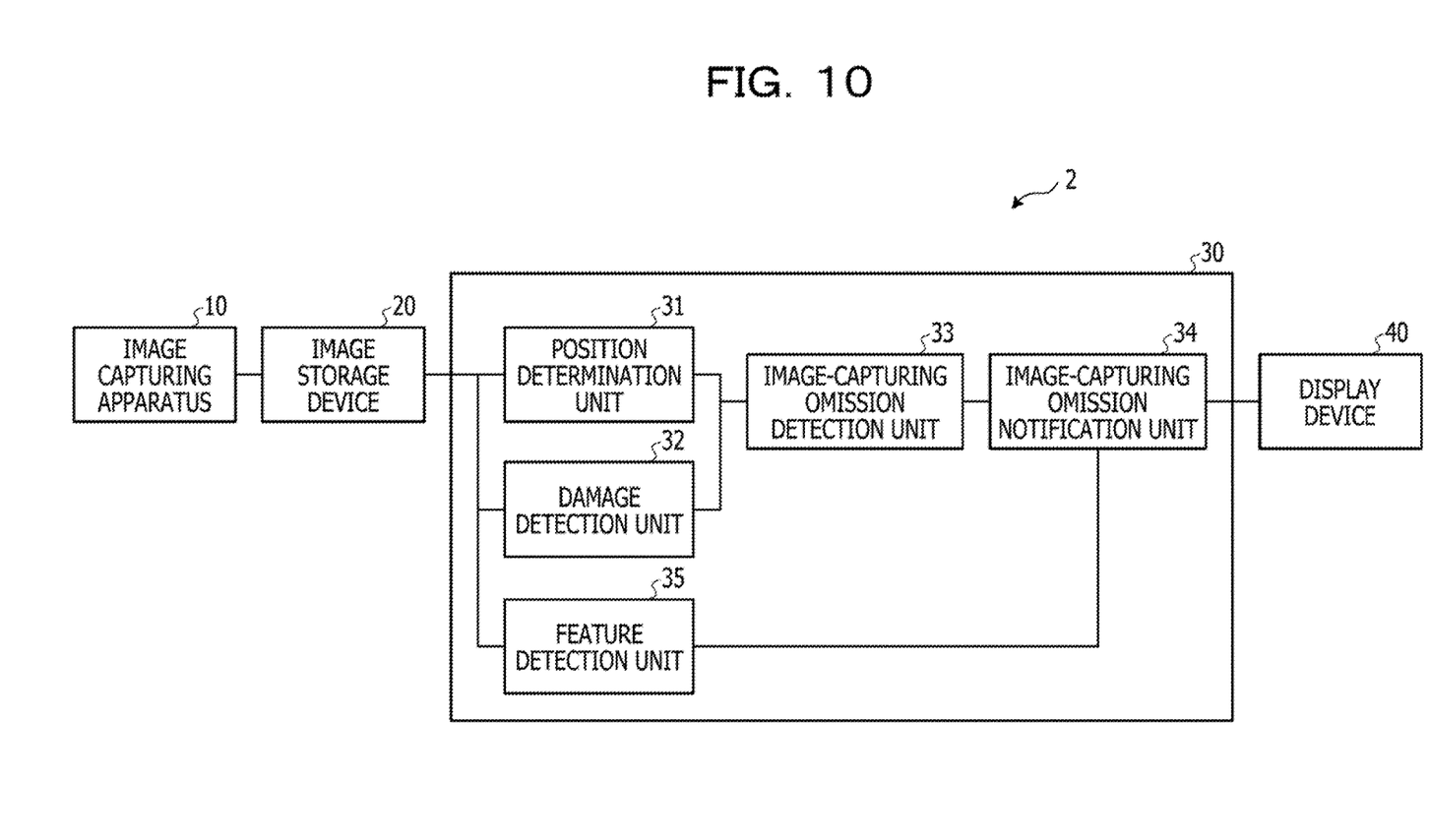
FIG. 10 is a block diagram illustrating an example of a system configuration according to a second embodiment.

FIG. 10 illustrates an example of an image-capturing omission detection system 2 according to the second embodiment. The image-capturing omission detection system 2 according to the second embodiment is different from the image processing system 1 according to the first embodiment in that the image-capturing omission detection apparatus 30 includes a feature detection unit 35.

The feature detection unit 35 detects an image of a characteristic visible feature that is easily visible by a person in a wide-angle image and is easily recognized by the person. The visible feature is set in advance by the user. The visible feature may be, for example, an image of numerals representing the size of a damaged portion written with a chalk by a user who visually inspects the damaged portion, an image of a formwork of a panel included in a bridge from which the damaged portion is to be detected, or the like. In the detection of the visible feature, the detected visible feature and position information thereof (for example, four vertices of a circumscribed rectangle of the visible feature) are stored. Any existing method is usable to detect the visible feature.

The feature detection unit 35 determines a positional relationship between the visible feature and the image-capturing omission region. For example, the feature detection unit 35 first selects a visible feature that is the closest to the image-capturing omission region. Then, the feature detection unit 35 selects, for example, a visible feature having the shortest distance between the centroid of the image-capturing omission region and the centroid of the circumscribed rectangle of the selected visible feature. Then, the feature detection unit 35 determines the direction of the image-capturing omission region with respect to the visible feature. For example, the feature detection unit 35 calculates an inclination of a line segment that links the centroid of the image-capturing omission region and the centroid of the circumscribed rectangle of the selected visible feature in the image.

Lastly, the feature detection unit 35 determines a distance between the visible feature and the image-capturing omission region. For example, the feature detection unit 35 calculates the distance between the centroid of the image-capturing omission region and the centroid of the circumscribed rectangle of the selected visible feature in the image. The distance may be divided by the width of the circumscribed rectangle of the visible feature to calculate the multiple of the distance relative to the visible feature.

The image-capturing omission notification unit 34 notifies a user of all the image-capturing omission regions. At the time of notification, the image-capturing omission notification unit 34 also notifies the user of a positional relationship with the visible feature. For example, the positional relationship may be displayed using text such as "on the right side of a character "0.1" written with a chalk, the position separated by the width of "0.1"×2", or "the position of ¼ of the panel formwork from the right end, and the position of ⅓ of the panel formwork from the upper end", or may be displayed with a simple illustration.

Figure 11:
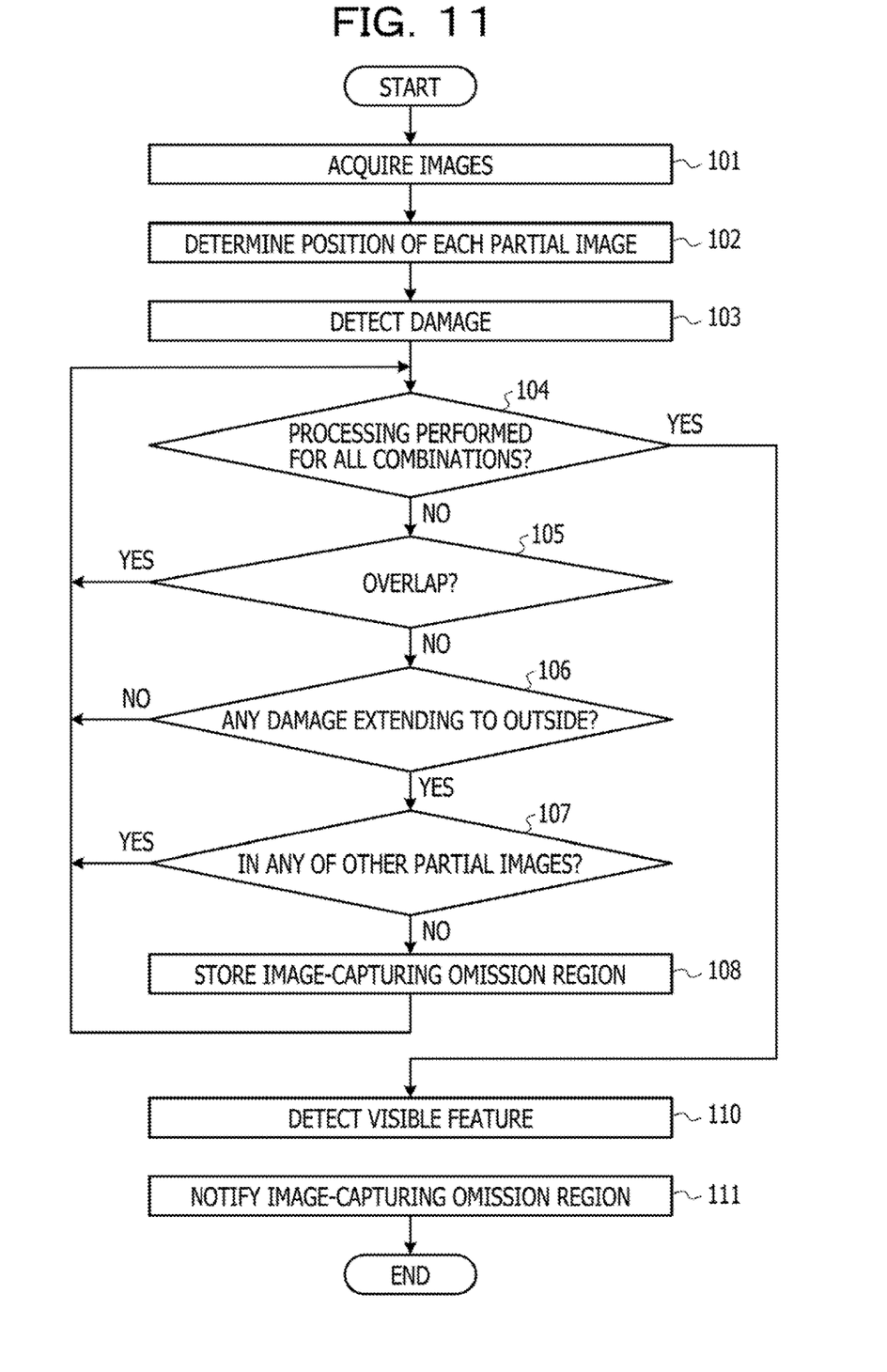
FIG. 11 is a flowchart illustrating an example of a flow of a process according to the second embodiment.

FIG. 11 illustrates an example of a flow of an image-capturing omission detection process. In step 110, the CPU 51 detects a visible feature set in advance. In step 111, the CPU 51 also notifies a user of the positional relationship with the visible feature when notifying the user of the image-capturing omission region.

In the present embodiment, a position of each of a plurality of partial images relative to a wide-angle image is determined based on the wide-angle image obtained by capturing an image of entirety of an image-capturing subject and the plurality of partial images obtained by sequentially capturing images of respective portions of the image-capturing subject while an image-capturing range is shifted for the respective portions. A pair of partial images that are consecutive in an image-capturing order, that do not have an overlapping portion, and at least one of which includes an image of a damaged portion is extracted from among the plurality of partial images. In a case where the damaged portion is estimated to be continuous to outside of the partial image including the image of the damaged portion among the extracted pair of partial images, a position of the outside of the partial image to which the damaged portion is estimated to be continuous is detected as an image-capturing omission candidate region. In a case where the image-capturing omission candidate region is included in none of the other partial images, the image-capturing omission candidate region is detected as an image-capturing omission region. Based on the determined position, a notification of the position corresponding to the image-capturing omission region in the wide-angle image is issued.

In the present embodiment, the user is notified of the position of the image-capturing omission region, along with information indicating a relationship with the visible feature. Consequently, according to the present embodiment, when images are captured again based on the notified image-capturing omission region, the image-capturing position may be easily determined by confirming the feature corresponding to the visible feature.

Note that the flowcharts of FIGS. 9 and 11 are merely examples, and the order of processing may be changed as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A detection apparatus comprising:
a memory; and
a processor coupled to the memory and configured to:
determine, based on a wide-angle image obtained by capturing an image of an entirety of an image-capturing subject and a plurality of partial images of respective portions of the image-capturing subject, a position of each of the plurality of partial images relative to the wide-angle image;
extract, from among the plurality of partial images, a pair of partial images that are consecutive in an image-capturing order, that do not have an overlapping portion, and at least one of which includes an image of a damaged portion;
detect, in a case where the damaged portion is estimated to be continuous to outside of the at least one partial image that includes the image of the damaged portion among the extracted pair of partial images, a region of the outside of the at least one partial image to which the damaged portion is estimated to be continuous, as an image-capturing omission candidate region;
determine the image-capturing omission candidate region as an image-capturing omission region, in a case where the image-capturing omission candidate region is included in none of the plurality of other partial images; and
issue, based on the position of each of the plurality of partial images relative to the wide-angle image, a notification of a position corresponding to the image-capturing omission region in the wide-angle image.

2. The detection apparatus according to claim 1, wherein the processor is configured to display the position of the image-capturing omission region using a rectangular image in the wide-angle image.

3. The detection apparatus according to claim 1, wherein the processor is configured to estimate that the damaged portion is continuous to the outside of the at least one partial image that includes the image of the damaged portion in a case where the image of the damaged portion is detected in an end region having a certain width along upper, lower, left, and right sides of the at least one partial image that includes the image of the damaged portion.

4. The detection apparatus according to claim 1, wherein the processor is configured to:
detect an image of a certain visible feature; and
issue the notification of the position of the image-capturing omission region, along with information indicating a relationship with the visible feature.

5. The detection apparatus according to claim 1, wherein the plurality of partial images are images obtained by sequentially capturing images of the respective portions of the image-capturing subject while an image-capturing range is shifted for the respective portions.

6. The detection apparatus according to claim 5, wherein the pair of partial images are consecutive in the image-capturing order among the plurality of partial images.

7. A detection method performed by an apparatus, comprising:
determining, based on a wide-angle image obtained by capturing an image of an entirety of an image-capturing subject and a plurality of partial images obtained by capturing images of respective portions of the image-capturing subject, a position of each of the plurality of partial images relative to the wide-angle image;
extracting, from among the plurality of partial images, a pair of partial images that do not have an overlapping portion and at least one of which includes an image of a damaged portion;
detecting, in a case where the damaged portion is estimated to be continuous to outside of the at least one partial image that includes the image of the damaged portion among the extracted pair of partial images, a region of the outside of the at least one partial image to which the damaged portion is estimated to be continuous, as an image-capturing omission candidate region;
determining the image-capturing omission candidate region as an image-capturing omission region, in a case where the image-capturing omission candidate region is included in none of the plurality of other partial images; and
issuing, based on the determined position of each of the plurality of partial images relative to the wide-angle image, a notification of a position corresponding to the image-capturing omission region in the wide-angle image.

8. The detection method according to claim 7, wherein the position of the image-capturing omission region is displayed using a rectangular image in the wide-angle image.

9. The detection method according to claim 7, wherein it is estimated that the damaged portion is continuous to the outside of the at least one partial image that includes the image of the damaged portion in a case where the image of the damaged portion is present in an end region having a certain width along upper, lower, left, and right sides of the at least one partial image that includes the image of the damaged portion.

10. The detection method according to claim 7, wherein an image of a certain visible feature is detected, and
the notification of the position of the image-capturing omission region is issued along with information indicating a relationship with the visible feature.

11. The detection method according to claim 7, wherein the plurality of partial images are images obtained by sequentially capturing images of the respective portions of the image-capturing subject while an image-capturing range is shifted for the respective portions.

12. The detection method according to claim 11, wherein the pair of partial images are consecutive in an image-capturing order among the plurality of partial images.

* * * * *